April 19, 1966  C. KIMBLETON  3,247,441
BATTERY CHARGING SYSTEM WITH ALTERNATE CONTROL
Filed Dec. 10, 1962
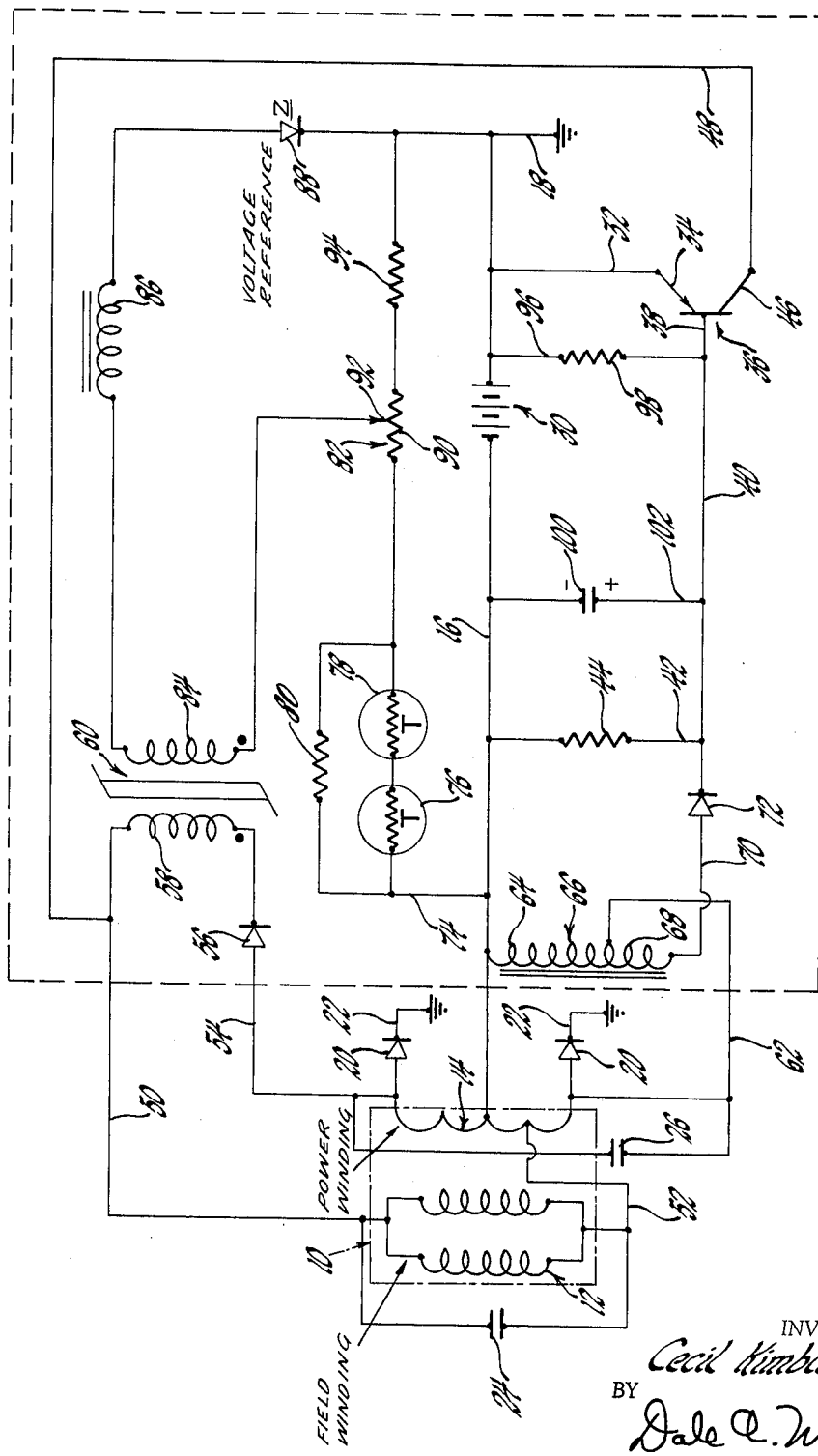
INVENTOR.
Cecil Kimbleton
BY
Dale R. Winnie
ATTORNEY 3,247,441
BATTERY CHARGING SYSTEM WITH ALTERNATE CONTROL
Cecil Kimbleton, Livonia, Mich., assignor to Curtiss-Wright Corporation, Utica, Mich., a corporation of Delaware
Filed Dec. 10, 1962, Ser. No. 243,413
4 Claims. (Cl. 320—12)

This invention relates to storage battery charging systems in general and more particularly to storage battery charging systems for use with inductor alternator power generating equipment provided on automotive vehicles and the like.

Automotive and other vehicles normally make use of a low voltage direct-current generator for storage battery charging purposes. The generator is usually driven by the vehicle engine and accordingly generates a variable voltage and current proportional to the output speed of the vehicle engine. This requires some means of voltage or current regulation to assure adequate recharging at low operating speeds and maintaining a substantially constant battery terminal voltage at higher operating speed conditions.

The most common type of voltage regulator for battery charging purposes is the vibrating contact relay which is adapted to interrupt the charging circuit when the battery potential is at a required level. Unfortunately, such regulators are not practical for use in the output circuit of most power generating equipment, where they might best serve their intended purpose, since full output current invariably cause pitting, sticking and ultimate failure of the vibrating contact points. Likewise, they are not suitable for use even in the field winding circuit of such inductor alternator generators where there is considerable variation in the field winding current.

It will also be appreciated that a high vibratory condition and a highly inductive circuit are also causes for ultimate mechanical or electrical failure making some other regulatory means more desirable.

It is an object of this invention to provide a battery charging system particularly suited for inductor alternator generators having a variable field current condition and more particularly a system wherein regulation is obtained without vibratory or other parts subject to mechanical failure.

It is a further object of this invention to provide an improved battery charging system with alternate control, namely, regulated field excitation by generator power subject to battery voltage control, and unregulated field excitation by battery current subject to generator voltage control.

More specifically, it is an object of this invention to provide a battery charging system having two means for supplying power to the field of an inductor alternator and wherein electrical means requiring a minimum power draw and having long serviceable life may be used as control components to provide fully automatic and responsive operation under varying conditions of alternator speed and battery load.

To be still more specific, it is an object of this invention to provide a battery charging system with alternate control for use with inductor alternators and wherein the storage battery may be used for field supply until the alternator is productive of an output suitable for maintaining the required battery terminal charge and whereafter the output of the alternator provides the required field current under restrictive controls precluding overcharging of the storage battery.

These and other objects and advantages in the practice of this invention will be more apparent upon a reading of the following specification in regard to the preferred embodiment shown by the accompanying drawing:

The single figure drawing is of a circuit diagram showing various electrical components in their preferred arrangement to provide the battery charging system of this invention.

Referring to the drawing in further detail:

The battery charging system of this invention includes an inductor alternator 10 having field windings 12 and a power winding 14. The power winding includes a center tap connection 16 to ground 18. Opposite halves of the power winding 14 are in turn connected through diode rectifiers 20 to ground connection 22.

Capacitors 24 and 26 are respectively provided in shunt lines across the field winding 12 and full power winding 14.

A storage battery 30 is provided within the power winding connection 16. The battery is connected by a conductor 32 to the emitter side 34 of a transistor 36. The base connection 38 of the transistor is connected by a conductor 40, through a conductor 42 including a resistor 44, back to the other side of the battery.

The transistor collector 46 is connected by a conductor 48 to one of the field winding leads 50. The other side of the field winding 12 is connected by a lead 52 through a part of the power winding 14 and the conductor 16 back to the storage battery.

As will be subsequently more fully appreciated, the circuitry just disclosed serves as the means for providing direct current field excitation for the alternator 10 from the storage battery 16.

One-half of the power winding 14 is connected by a conductor 54 through a diode rectifier 56 and the gate winding 58 of a saturable reactor or magnetic amplifier 60 to the field winding connection 50.

The other half of the field power winding 14 is connected by a conductor 62 through the primary winding 64 of an auto transformer 66 to the battery connecting lead 16. The secondary winding 68 of the transformer 66 is connected by a conductor 70 through a diode rectifier 72 and through conductor 40 to the transistor base connection 38. A connection 96 including a resistor 98 limits excess current to the transistor base 38 from the transformer 66.

This same half of the power winding 14 is also connected by a conductor 74 through thermistors 76 and 78, with resistor 80 provided thereacross, and through a potentiometer 82 to the control winding 84 of the magnetic amplifier 60. The other side of the control winding is in turn connected through an inductor 86 and a battery voltage reference 88 such as a Zener diode Z, to the ground side of the battery 30.

It will be noted that the resistor 90 of the potentiometer is provided in series with the temperature compensating resistors and that the slider 92 of the potentiometer is connected to the mag-amp control winding. Further, a resistor 94 is connected between the potentiometer resistor 90 and the return lead to the storage battery 30.

In the initial operation of the disclosed system, a small current is provided to the base 38 of the transistor through a conductor 32 and emitter 34. The transistor base current flows through conductor 40 and resistance 44 back to the battery. This small current through the base of the transistor 36 enables a large current flow from the emitter 34 to the transistor collector 46, through the conductor 48 and to the field winding lead 50. Accordingly, essentially full battery voltage is initially available for excitation of the alternator field coils 12.

Rotation of the inductor alternator armature during the supply of this field current causes the power windings 14 to develop an output voltage. This voltage is applied to various portions of the disclosed system; for both battery charging and field control purposes. One control element energized by the power voltage is an auto transformer 66 having a secondary winding 68.

The alternator output is stepped up and applied through the secondary winding 68 of the transformer and diode 72 to the transistor base 38. A capacitor 100 is provided in a line 102 between the transistor base conductor 40 and the input lead to battery 30. The capacitor 100 serves as a filter with the resistor 44. When the voltage across the capacitor 100 builds up higher than that of the storage battery 30 the potential on the transistor base 38 is reversed and current flow between the transistor emitter 34 and collector 46 is cut off. This, as will be appreciated, interrupts alternator field excitation from the storage battery. Thus, an auxiliary closed-loop system responsive jointly to power winding and battery voltages controls the transistor.

Power is also fed on a half cycle basis from the power winding 14 through the diode 56 and mag-amp gate winding 58 to the field winding 12 and shunting capacitor 24, for producing regulated power charging current when excitation of the field from the battery is cut off.

This mode of operation continues until the voltage between the slider 92 of the potentiometer 90 and the ground point 18 representing potential drop due to the power winding current, becomes equal to the break down voltage of the battery reference diode 88. At this occurence, a current flows from the fully charged storage battery 30 through the battery voltage reference diode 88, inductor 86, control winding 84, resistor 94, part of the potentiometer resistor 82, through the parallel combination of thermistors 76 and 78 and resistor 80, and through leads 16 back to the storage battery. This D.C. current resets the flux in the core of the magnetic amplifier 60 which delays the starting time in the current half-cycle when the impedance of the mag-amp briefly drops to a low value, thereby admitting current through the gate 58 at a value dependent primarily upon the total impedance of the field circuit. Due to the temporarily high battery voltage, the control current through winding 84 increases causing the field current through the gate winding 58 gradually to diminish until the field excitation through the mag-amp is essentially stopped. The voltage across capacitor 100 reduces and the transistor 36 reverts to a conductive state. The field windings 12 are then re-energized directly from the storage battery 30, power winding voltage builds up again, the voltage differential across the capacitor 100 increases and the transistor 36 is again cut off.

In practice where the alternator may operate at widely different speeds and the battery is subject to accessory loads that also may vary widely, the alternator and battery are interrelated as described above so that when pulsating power from the alternator becomes capable of regulating the system voltage, the battery is prevented from supplying field excitation power. Conversely, if the pulsating power source becomes unable to maintain proper field excitation, the battery then supplies essentially full battery voltage to the field. In situations where the pulsating power field current is building up excessive battery voltage, the Zener diode functions to introduce mag-amp control and the field is thereby reduced. The power voltage is correspondingly reduced and if it drops sufficiently, the transistor 36 is restored to conducting state and the field is again energized by unregulated battery power until the alternator picks up to maintain proper field excitation.

This ON-OFF mode of energizing the field continues until the system receives a load which makes it necessary for the field to be continuously energized.

I claim:

1. A battery charging system for use with an alternator generator having field and power output windings, wherein a storage battery is connected to said power winding for charging the battery, comprising a transistor connected between the battery and the generator field winding for both initial and cyclic energization of the field winding from the battery, auxiliary closed loop circuitry responsive jointly to power winding voltage and the battery voltage for controlling the conductive state of the transistor, a magnetic amplifier having a control winding connected through a Zener diode to the battery, and a gate winding connected between the field and power windings, said diode becoming conductive when subjected to auxiliary closed loop circuitry potential corresponding to a battery voltage reference for energizing said control winding from the battery, thereby decreasing the gated field current and causing drop in power voltage, said auxiliary closed loop circuitry being responsive to said voltage drop for biasing the transistor to conducting state and energizing the field from the battery, thereby increasing the power voltage, said transistor being biased to cut-off for isolating the battery from the field when the power voltage exceeds battery voltage, the Zener diode again becoming conductive in response to the aforesaid reference voltage for controlling power excitation of the field to repeat the cycle.

2. The battery charging system of claim 1: said auxiliary closed-loop circuitry being connected to the power winding, battery and transistor and including a condenser for applying the difference between a power winding voltage and the battery voltage to a control element of said transistor.

3. A battery charging system for use with an inductor alternator having field and power output windings and wherein the power winding is connected to a storage battery for charging purposes, comprising alternate circuits for exciting the field winding in an alternate on-off cycle from the battery and power winding respectively, said circuits constituting a first circuit including said battery and a transistor connected thereto for direct initial excitation and for subsequent cyclical excitation of the field winding, said transistor also being responsive to power winding voltage for cut-off according to increase of the power voltage with respect to a battery voltage reference, and a second circuit connected to said battery and including a Zener diode in series with the control winding of a saturable reactor, said reactor having a gate winding for controlling excitation of the field from the power winding according to energization of said control winding through the diode, said diode becoming conductive according to build-up of power voltage to a battery reference value in said second circuit, and becoming nonconductive upon drop of power voltage due to gated control of the field excitation, said power voltage drop also causing said transistor again to conduct for retransferring the battery from the control winding of said reactor to direct connection with the field winding for repeating the cycle.

4. A battery charging system for use with an alternator having field and power output windings, wherein a storage battery is connected to and charged from the power winding, comprising alternate first and second circuits for supplying exciting current to the field in an on-off cycle, the first circuit including said battery and electronic switching means directly connected to the field for unregulated excitation thereof, and the second circuit also including the battery, a voltage reference diode and the control winding of a saturable reactor, said reactor having a gate winding interconnecting the field and power windings for restricting and regulating excitation of the field from the power winding according to control winding current, said second circuit also being connected to the power winding for applying a break-down voltage to said diode as the power voltage increases according to a reference value, said control winding being energized from the battery during conduction of said diode for reducing the power voltage, said electronic switching means having a control element responsive to drop of the power voltage with respect to the battery voltage for completing the excitation circuit between the battery and field and thereby increasing the power voltage, said control element subsequently being responsive to a power voltage increase for causing interruption of said excitation circuit and repeating the cycle.

References Cited by the Examiner

UNITED STATES PATENTS

| | | | |
|---|---|---|---|
| 2,874,346 | 2/1959 | Orvis | 323—89 X |
| 2,978,633 | 4/1961 | Medlar | 323—89 |
| 3,011,115 | 11/1961 | Grady | 320—64 |
| 3,030,568 | 4/1962 | Oda et al. | 322—100 X |
| 3,152,298 | 10/1964 | Byles | 320—68 X |

MILTON O. HIRSHFIELD, *Primary Examiner.*

LLOYD McCOLLUM, *Examiner.*